Reissued May 23, 1939 Re. 21,095

UNITED STATES PATENT OFFICE 21,095

ART OF DISTILLING OILS

Robert E. Humphreys, Whiting, Ind., assignor to Standard Oil Company, Whiting, Ind., a corporation of Indiana No Drawing. Original No. 1,647,629, dated November 1, 1927, Serial No. 548,531, March 31, 1922. Application for reissue January 26, 1929, Serial No. 335,380

5 Claims. (Cl. 196—50)

The present invention relates to improvements in the art of producing gasoline or hydrocarbon oils of the gasoline range of boiling points from hydrocarbon oils having higher boiling points. It will be fully understood from the following description, in which specific methods for carrying the invention into effect are described.

The present invention relates particularly to methods for the production of hydrocarbon oils of the gasoline range of boiling points in which gas oil or other distillate oil having an initial boiling point of 600° F. or higher is initially distilled under a pressure of 60 to 100 lbs. per square inch. In the course of such distillation, hydrocarbon oils of the boiling point range of gasoline, say from 120° F. to 394° F. are formed and distilled off, usually accompanied by oils of a higher boiling point range, approximately that of the kerosene type of hydrocarbon oils. At the termination of such a distillation a tar or bottom is present in the still which contains small proportions of hydrocarbon oils of the boiling point range of kerosene and larger proportions of oil having the boiling point range of gas oil, that is, between 650° and 800° F. In the further handling of these products, the distillate from the pressure stills is redistilled to separate the gasoline, a residue of kerosene-like characteristics being obtained and the tar is separated into its various fractions, either by steam or dry distillation, ordinarily the latter. It has hitherto been customary to re-introduce the stocks thus formed, namely, the bottoms from the pressure-distillate and the fractions of the pressure tar having boiling points not higher than those of gas oil into the stocks fed into the pressure stills in which the original distillation takes place, such stocks being designated as cycle stocks when so re-introduced.

In accordance with the present invention, cycle stocks, that is, stocks recovered from pressure-distilled materials and having boiling-points above the gasoline boiling point range, are introduced into a still operating at a pressure exceeding 300 lbs. per square inch, and are therein distilled for the formation of gasoline. A commercially effective production of gasoline is procured therefrom and at the same time the average rate of production of gasoline from the stills operating at 4 to 6 atmospheres pressure is materially increased by reason of the elimination therefrom of the cycle stocks.

The present invention is illustrated by the following example:

A cut from crude oil having a boiling point range of, say 650 to 800° F., is charged into a still, which is gradually brought to the distillation point at a pressure of from 4 to 6 atmospheres, say 90 lbs. per square inch. A distillate is produced containing, for example, about 55% of hydrocarbon oil boiling below 392° F., that is, of the gasoline range of boiling-points, the entire distillate having a maximum boiling point of about 600° F. The pressure distillation is continued, oil of the character of the original oil charged into the still being fed thereinto at a rate such as to maintain substantially a constant volume of oil in the still. The distillation is continued until the residue or bottom in the still has a volume of about 45% of the volume of the original charge. Upon termination of the distillation the pressure distillate is re-distilled, preferably with steam, and the fraction having the gasoline range of boiling points is removed therefrom, a pressure distillate bottom or residue having a boiling point range of 350 to 600° F. remaining. This residue or bottom, having a gravity of 35.5 to 36.5 Baumé, is charged into a still and heated under a pressure in excess of 300 lbs. per square inch, say 325 lbs. In this distillation the liquid still contents may attain a temperature of 740 to 765° F. The vapors evolved, which contain a large proportion of gasoline constituents, are condensed, either under the pressure of distillation or a lower pressure. This distillate may be redistilled to separate the gasoline constituents, and the bottom from this last distillation added to the cycle stocks introduced into the high pressure still. Other cycle stocks, for example, those derived from the tars or residues obtained in the low pressure still, may be treated in the high pressure still in like manner.

I claim:

1. The improved method of manufacturing gasoline which consists in distilling a hydrocarbon oil distillate having a boiling point range of 650 to 850° F. under a pressure of 60 to 100 lbs. per square inch, separating from the products of such distillation a distillate stock having an initial boiling point approximating the maximum boiling point of gasoline, and redistilling the separated stock under a pressure in excess of 300 lbs. per square inch for the further formation of gasoline.

2. The improved method of manufacturing gasoline which consists in distilling under pressure a hydrocarbon oil distillate having an initial boiling point above the gasoline boiling point range, thereby producing a distillate containing gasoline and heavier fractions, separating the heavier fractions from the gasoline in said distillate and subjecting the heavier fractions of said distillate from the pressure distillation to a further distillation under a pressure in excess of 300 lbs. per square inch.

3. A method of making gasoline which consists in subjecting charging oil to cracking conditions of temperature and a superatmospheric pressure to convert the oil to produce hydrocarbon substances containing gasoline and heavier fractions, in separating the heavier fractions from the lighter gasoline-like products thereby producing a refractory distillate, and in subjecting a liquid body of such distillate to a cracking temperature while under a substantially increased pressure in an independent cracking zone where the distillate remains segregated from the unvaporized fractions of the charging oil.

4. An oil conversion process consisting in subjecting charging oil to cracking conditions of temperature and super-atmospheric pressure sufficient to convert a substantial portion of said oil into gasoline-like materials, in separating the products of conversion into a light gasoline-like material and a heavier refractory distillate, in subjecting said refractory distillate to a cracking temperature while a substantial portion thereof is maintained in a liquid condition by a super-atmospheric pressure substantially exceeding the pressure maintained on the charging oil, and in maintaining such distillate segregated from the unvaporized fractions of the charging oil during the conversion thereof, and in recovering the products of conversion.

5. An oil conversion process consisting in subjecting charging stock to a cracking temperature while under a pressure of at least 100 lbs. per square inch to convert a substantial quantity of such oil into lighter products, in separating the products of conversion into a light gasoline-like material and a heavier refractory distillate, and in subjecting a body of said distillate in a liquid condition to a cracking temperature while under a pressure of not less than 125 lbs. per square inch and while such distillate is segregated from the unvaporized residue of the charging stock.

ROBERT E. HUMPHREYS.